US006453216B1

(12) United States Patent
McCabe et al.

(10) Patent No.: US 6,453,216 B1
(45) Date of Patent: Sep. 17, 2002

(54) METHOD OF CONTROLLING AN IRRIGATION SYSTEM

(76) Inventors: James F. McCabe, 1103 Sycamore, Richmond, TX (US) 77469; Clifford R. Hawkins, 10127 Cedar Edge, Houston, TX (US) 77064

( * ) Notice: Subject to any disclaimer, the term of this patent is extended or adjusted under 35 U.S.C. 154(b) by 0 days.

(21) Appl. No.: 09/350,339

(22) Filed: Jul. 14, 1999

(51) Int. Cl.[7] ............................. G05D 7/00; G05D 11/00
(52) U.S. Cl. ...................... 700/284; 137/78.2; 239/723
(58) Field of Search .......................... 700/14, 284, 306; 239/723; 137/78.2

(56) References Cited

U.S. PATENT DOCUMENTS

| | | | | | |
|---|---|---|---|---|---|
| 4,922,433 A | * | 5/1990 | Mark | .......................... | 364/510 |
| 5,023,787 A | * | 6/1991 | Evelyn-Veere | .............. | 364/420 |
| 5,251,153 A | * | 10/1993 | Nielson et al. | ............. | 364/550 |
| 5,355,122 A | * | 10/1994 | Erickson | ..................... | 340/602 |
| 5,479,339 A | * | 12/1995 | Miller | ........................ | 364/145 |
| 5,696,671 A | * | 12/1997 | Oliver | ........................ | 364/140 |
| 5,870,302 A | * | 2/1999 | Oliver | ................... | 364/140.01 |
| 6,079,433 A | * | 6/2000 | Saarem | .......................... | 137/1 |
| 6,108,590 A | * | 8/2000 | Hergert | ...................... | 700/284 |

* cited by examiner

Primary Examiner—Thomas Black
Assistant Examiner—Crystal J Barnes
(74) Attorney, Agent, or Firm—Arthur M. Dula

(57) ABSTRACT

The present invention is a method of controlling an irrigation system that minimizes the use of irrigation water comprising defining a stop time for each watering event that is as late as possible to maximize the statistical contribution of predicted or actual rainfall to the proper watering of crops or turf. High rain probabilities cause deferral of the watering event. The present invention includes the embodiments of watering the largest water volume/water flow rate zone last, measuring the actual water applied and using mathematical curve-fitting techniques incorporating historical data from recent watering events to calculate actual plant/soil response to applied water for each irrigated zone.

10 Claims, 5 Drawing Sheets

Current Water Use In Texas
1995
(million acre-feet)

Irrigation 10.12
64.4%

Other 0.95
5.4%

Other:

Livestock- 0.27
Steam
Electricity- 0.43
Mining-    0.15

Total-     0.85

Manufacturing 1.56
9.9%

Municipal 3.18
20.2%

Total 15.71

Figure 1

METHOD OF CONTROLLING AN IRRIGATION SYSTEM

THE FIELD OF THE INVENTION

The present invention relates generally to methods of controlling an irrigation system. More specifically, the present invention relates to methods of controlling an irrigation system to minimize the amount of irrigation water applied to a turf or crop while still meeting the crop or turf,s water requirements. Still more specifically, the present invention relates to methods of controlling an irrigation system that minimizes water use by setting irrigation schedules to take maximum advantage of natural rainfall, soil response to watering on a historical basis and the maturity of the turf or crop's root systems.

THE BACKGROUND ART

Normally, vegetation and greenery grow in soil watered by rain. Where rain is so seasonal that the quantity of rainfall fails to meet the requirements of particular types of vegetation, or when the amount of rainfall is deficient or practically nonexistent, the extreme drying of the soil may retard, and eventually prevent, vegetation growth. Irrigation can compensate for the vicissitudes of nature by supplying water directly to areas of vegetation and greenery in regular intervals and in sufficient volumes.

Earlier techniques and methods of irrigation which were utilized to provide supplemental watering to vegetation and greenery located remote distances from a water source, traditionally included, for example, such methods as supplying water manually by hand and bucket directly to the vegetation, or by such means as constructing simple aqueduct systems. Aqueduct systems of the prior art were generally constructed by forming long furrows or canals immediately alongside the vegetation or greenery to provide moisture and promote vegetation growth and productivity. Over time, various other types of irrigation techniques and devices were developed by those skilled in the art to simplify and supplement traditional methods of irrigation. For example, simple mechanical lifting aids and animal-powered irrigation devices were developed to assist users in transporting water from a water source to a localized area of vegetation requiring supplemental irrigation. The farmer, who used his skill and experience to determine when the flow of water should be started and stopped to yield a good crop, controlled these early devices.

As technology progressed with the advent of steam power, the internal combustion engine and electricity, irrigation systems became fully mechanized operations in many parts of the world. Many of the earlier traditional techniques and methods of providing irrigation were replaced by mechanical devices with internal programmable timer units. Moreover, mechanical irrigation devices of the prior art revolutionized the irrigation industry by providing a novel means for automating the control of water flow from a pressurized water source through such means, as for example, portable, lightweight aluminum piping, to numerous watering stations located remote distances from the water source.

Traditionally, automatic electromechanical controllers of the prior art incorporate multiple conventional motor-driven electric clocks which provide a mechanized means for programming individual start times for various irrigation cycles and watering stations. Calendar programs are generally incorporated to provide a means for selecting particular days of operational watering which normally includes a period over 14 days. Typically, calendar programs used in conjunction with prior art electromechanical controllers are functionally realized through the use of a disc being mechanically rotated to a next day position by a conventional motor-driven clock, once every 24 hours.

Employed in all but the simplest versions of electromechanical irrigation controllers of the prior art, cycle start circuits are typically provided to activate additional timer motors for advancing the irrigation controller through multiple preset watering cycles. Pins are generally placed in clock dials to close a switch at a preset time and, if the circuit is completed through a switch held closed by the calendar wheel pin on a day designated for irrigation, the watering cycle typically starts. In this regard, cycling water from station to station and programming watering intervals and timing durations for individual watering stations or zones may be accomplished by the placement and specific arrangement of various functional pins, cams, levers and other mechanical devices of prior art electromechanical controllers which interact with one another in concert to provide preprogramming automation for an irrigation system.

Increasing the number of watering zones or stations of prior art automatic electromechanical irrigation controllers to expand the watering capabilities of the irrigation system and provide water to larger areas of vegetation or greenery, such as golf courses, cemeteries, or parks, typically involves a significant number of mechanical disadvantages in the overall performance of the irrigation system. Moreover, in expansion of the watering capabilities of an irrigation system employing automatic electromechanical controllers of the prior art generally requires a dramatic increase in the number of working parts to realize and effectuate the additional programming capabilities typically required when increasing the number of watering stations or zones of an initial irrigation system.

In response to the problems associated with the dramatic increase in mechanical working parts required by prior art electromechanical irrigation controllers when expanding the watering capabilities of an irrigation system, those skilled in the art developed automatic solid state irrigation controllers which eliminated electric motors, mechanical switches, actuating pins, cams, levers, gears and other mechanical devices typically associated with electromechanical controllers and replaced them with solid state electronic circuitry. The programming potential of automatic solid state controllers of the prior art generally permits the user to program, for example, multiple start times and day programs for individual watering stations, repeat cycles, watering time selections in minutes (sometimes seconds), while maintaining the split-second accuracy of solid state timing without requiring the numerous interacting mechanical parts employed by prior art electromechanical irrigation controllers.

Automatic solid-state irrigation controllers of the prior art typically provide a user with several program sequences from which to select. Generally, the user has the option to choose from multiple program sequences offered by the controller and determine the specific program options which best accommodate the particular watering needs of the user's vegetation and greenery in a most advantageous manner. In this regard, each of the various program sequences typically has independent start times that may include several start times per day. In all the prior art known to the present inventors, the start time of the watering event is specified. The system then delivers water for a set amount of time.

To accommodate and sustain multiple program sequences, solid state irrigation controllers of the prior art generally incorporate a programmable microprocessor-controlled user interface that provides a user with the capability of programming several sprinkling stations or zones in a variety of timing scenarios, for example, daily, weekly, odd days, even days, etc. Each watering station or zone usually includes one or more sprinklers and a solenoid valve that is generally regulated by the microprocessor unit. Solenoid valves typically control the flow of water entering a particular watering station from a pressurized water source, and provide a means for monitoring the flow of water exiting the watering station through various sprinkler lines that typically terminate into a plurality of sprinkler heads strategically located throughout an irrigation area.

Other general features of automatic solid-state irrigation controllers of the prior art may include manual modes of operation that generally function to provide the user with an option of overriding all preprogrammed automatic watering operations of an irrigation controller. For example, manual operational modes of prior art solid state irrigation controllers may be utilized when excessive amounts of rain have fallen, or when a lengthy spell of dry weather has occurred requiring greater quantities of irrigation than previously programmed by the user to sustain vegetation growth and productivity.

Manual override functions on irrigation systems are being automated as water becomes more expensive. A rain sensor is a simple device, usually employing a wetable disk that activates an electrical circuit when dampened by rain, which is mounted in an open area outdoors and wired to the shutoff valve on the common line of the irrigation system. Rain sensors are designed to override the cycle of an automatic irritation system when adequate rainfall has been received. They are simple "on" or "off" sensors. Rain sensors are now being made mandatory. For example, Ordinance 1948, which was adopted on Aug. 14, 1997 by the town of Cary, N.C., requires a rain sensor to be installed on all new and existing commercial irrigation systems and set to turn off the irrigation system when ¼" of rainfall has occurred.

Large-scale central control of irrigation can be economically important. For example, the San Diego Unified School District is installing a Rain Bird computerized Maxicom2 Central irrigation control system, which includes on site weather stations, to control the irrigation at more than 100 schools in the San Diego metropolitan area. This system is projected to save 127 million gallons of water annually, representing a potential cost savings of over $390,000 at current market prices.

Since watering intervals and irrigation amounts are typically dependent upon the type of vegetation or greenery, serious disadvantages may result when operational limitations of an irrigation system are consistently manipulated by manual operational modes without regard to the specific watering needs of particular vegetation.

Evapotranspiration (ET) is a measurement of the total amount of water needed to grow plants and crops. This term comes from the words evaporation (i.e., evaporation of water from the soil) and transpiration (i.e., transpiration of water by plants). Different plants have different water requirements, so they have different ET rates. Plants also have different ET rates at different times in their growth cycle.

Since there are thousands of cultivated plants, experts have tried to simplify matters by establishing a standard ET rate for general reference and use. The standard is referred to as the potential evapotranspiration. This is the potential ET assuming the crop is in a deep soil and under well-watered conditions. The standard crop is a cool season grass which is 4-inches tall. The technical term for this is the "Potential evapotranspiration of a Grass Reference Crop" or "PET" for short.

PET depends on the climate and varies from location to location. Special weather stations are used to collect the climatic data for calculating PET, including temperature, dew point temperature (relative humidity), wind speed, and solar radiation. A prior art example of a central irrigation and data logging system is the system built and sold by Sensing and Control, Inc. of San Diego, Calif.

The water requirements of specific crops and turf grasses can be calculated as a fraction of the PET. This "fraction" is the called the crop coefficient (Kc) or turf coefficient (Tc). Crop coefficients vary depending on the type of plant and its stage of growth. Detailed information on crop and turf coefficients and how to use them is presented at http://agen.tamu.edu/vet/tools/coe-tool.html.

This specification uses PET calculated by the Penman-Monteith method from weather station data. This is one of a number of methods that can be used to determine PET and ET. Several organizations, such as the International Committee on Irrigation and Drainage and the-Water Requirements Committee of the American Society of Civil Engineers have proposed establishing the Penman-Monteith method as a worldwide standard. Such a standard facilitates the sharing of PET data and development of crop coefficients.

In Texas, the Penman-Monteith method is used in the North Plains PET Network, a joint project between the Texas Agricultural Extension Service, the Texas Agricultural Experiment Station and the USDA-ARS Laboratory in Bushland. For more information on the Penman-Monteith equation and other methods for determining PET, see *Evapotranspiration and Irrigation Water Requirements*, edited by M. E. Jensen, R. D. Burman, and R. G. Allen. Published by the American Society of Civil Engineers, New York, N.Y. 1990. 332pp.

Universities now include irrigation water management within their departments of agricultural engineering. Water management is a critical issue for water conservation districts throughout the country. The cost effective use of irrigation, which is dependant on the proper control of the irrigation system is a major problem for agrobusiness as well as for industry and municipalities. Within large cities, the economical use of water is an absolute necessity, especially use by large users such as school districts, parks and golf courses.

There are significant disadvantages, however, associated with all prior art methods of controlling irrigation systems. For example, all prior art systems define a start time to apply water to the turf or crop. Even if the system has a rain sensor, if the rainfall begins after the system's start time and the rain quantity is sufficient to supply the necessary water, then all the irrigation water applied prior to the start of the rainfall is wasted. For another example, prior art systems do not maintain a history of soil tension to allow in situ calculation (by least squares, or regression analysis, or any other appropriate method of curve fitting) of a characteristic curve showing the amount of water required to bring the soil moisture (or tension) from its measured value to a desired value. Still another problem associated with all prior art methods of controlling an irrigation system is that prior art systems do not take into account that newly planted landscapes or crops do not have their roots either fully developed or in intimate contact with the soil, thus they may need more water-than would be the case for a mature crop or turf.

BRIEF SUMMARY AND OBJECTS OF THE INVENTION

In view of the foregoing, it is the primary object of the present invention to provide a method of controlling an irrigation system that is more efficient than the methods taught by the prior art by operating the irrigation system so as to maximize the contribution to the watering event by natural rainfall and by measuring the actual water applied to the crop and the soils actual response to the application of water, thus minimizing the waste of irrigation water.

It is therefore one purpose of the present invention to provide an improved method of controlling an irrigation system wherein the watering event is defined by the stop time of the watering event, rather than by the start time, as taught by the prior art, in order to delay the irrigation as long as is possible in order to allow the system to statistically take advantage of natural rainfall.

Another purpose of the present invention is to provide an adaptive irrigation control that uses data from several recent watering events to determine the actual response of the soil (tension or moisture content) to the application of water.

Still another purpose of the present invention is to provide a method of controlling an irrigation system that modifies the watering schedule based on the predicted probability of rainfall. In this mode, the system would delay or reduce irrigation if the prediction of rain was high and would only irrigate if the predicted rainfall did not occur.

A further purpose of the present invention is to provide an method of controlling an irrigation system having multiple irrigation zones wherein the zone having the greatest water flow rate is irrigated last in order to maximize the possibility of rainfall contribution to the watering event.

Another purpose of the present invention is to provide a method of controlling an irrigation system having multiple irrigation zones that conserves water by irrigating the zone that requires the greatest volume of water last in order to maximize the possibility of the contribution of rainfall to the watering event.

And yet another purpose of the present invention is to provide a method of controlling an irrigation system that measures the amount of rainfall and then calculates the amount of water required to complete the necessary irrigation.

Yet another purpose of the present invention is to provide a method of controlling an irrigation system that provides a 'set in mode' to provide the correct amount of water for newly planted crops or turf.

Another purpose of the present invention is to provide a method of controlling an irrigation system that measures the actual amount of water flowing through the system so the irrigation amount can be calculated in inches of water, or other familiar precipitation units.

BRIEF DESCRIPTION OF THE DRAWINGS

FIG. 1 is a pie graph showing the uses of water in Texas in 1995;

DETAILED DESCRIPTION OF THE PREFERRED EMBODIMENT

In order to appreciate the importance of the present invention, it is helpful to understand the amount of water used for irrigation and how the supply and demand for irrigation water will change over time as population increases. The projections of the Texas Water Development Board provide an instructive example.

Figure 2:
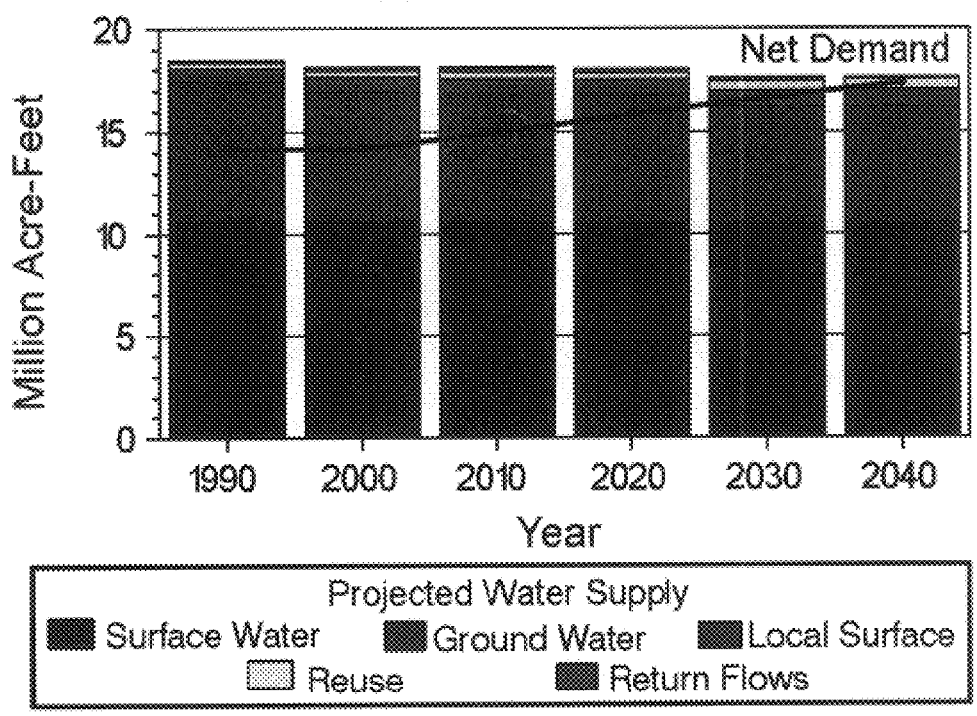
FIG. 2 is a bar graph showing the projected statewide water demand and supply for Texas 1990 to 2040.
Figure 3:
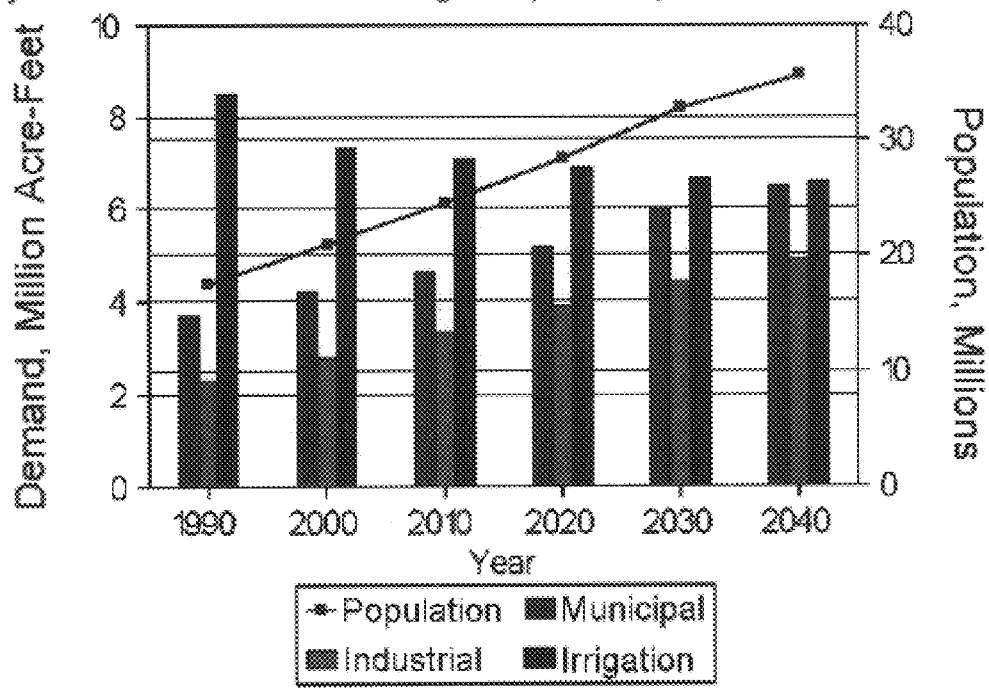
FIG. 3 is a bar graph showing the projected water demand and population of Texas from 1990 to 2040.

FIG. 1 shows that in 1995 Texas used a total of 15.71 million acre-feet of water. Of this total amount, 64.4 percent (10.12 million acre-feet) was used for irrigation and 20.2 percent (3.18 million acre-feet) was used for municipal purposes. FIG. 2 shows that the projected water supply for Texas from 1990 to 2040 will be nearly constant at about 18.5 million acre-feet. The demand for water, however, will steadily increase from about 15 million acre-feet in 1990 to over 18 million acre-feet in 2040. As is shown in FIG. 3, this rise in total water demand is expected to result from a rise in both industrial and municipal use of water as the population of Texas increases from about 18 million in 1990 to about 35 million in 2040.

The increasing municipal and industrial water use projected for this 50-year period requires a decrease in water used for irrigation from 10.12 million acre-feet in 1995 to 6.3 million acre-feet in 2040. This official projection of water use by the state of Texas mandates a 36 percent decrease in the amount of water used for irrigation.

The method of the present invention first defines the time when irrigation must end, for example watering must end in time for students or workers to get to work without being soaked by the sprinkler system at a school or factory, or by the time that play starts at a golf course. The method of the present invention next uses whatever weather inputs and soil inputs are available to calculate a start time that is proper to allow the irrigation system to deliver the necessary water. The present invention may take into account a prediction of a high probability of future natural rainfall. If the future probability of natural rainfall is sufficiently high, then the method of the present invention will delay (or reduce) the watering event by a time in the hope that it will rain and thus reduce the need for irrigation water. The present invention may irrigate the smallest water volume and the smallest water flow rate zones first, because, if it does rain, less water would be wasted than if the high water volume/water flow rate zones were irrigated first.

If an irrigation system is operated according to the method of the present invention, then the largest possible portion of water needed by the crop of turf will be contributed by natural rainfall and the least irrigation water will be used, consistent with maintaining a proper level of soil moisture for the crop or turf being irrigated.

Turning again to the specific example of Texas, Table 1 below shows the historical average rainfall by month for several major Texas cities. Table 2 below shows the Potential Evapotranspiration (PET) in inches of water per month for these same Texas cities. The total rainfall varies from a low of 7.70 inches in El Paso to a high of 50.5 inches in Port Arthur. The total PET ranges from a low of 44.28 inches in Galveston to a high of 66.05 inches in El Paso. Every Texas city requires some irrigation, with the greatest water requirement being in El Paso. But in every case, even El Paso, natural rainfall can potentially make a significant contribution (in the case of El Paso, about 11%) to the water needed for irrigation. In Port Arthur the rainfall contribution could be as high as 86 percent over an average year.

TABLE 1

Rainfall in Inches per Month

| City | Jan | Feb | Mar | Apr | May | Jun | Jul | Aug | Sep | Oct | Nov | Dec | Total |
|---|---|---|---|---|---|---|---|---|---|---|---|---|---|
| Abilene | 0.87 | 0.90 | 1.00 | 2.20 | 3.25 | 2.50 | 2.25 | 2.25 | 3.50 | 2.25 | 1.25 | 0.85 | 23.07 |
| Amarillo | 0.50 | 0.59 | 0.83 | 1.08 | 2.87 | 3.52 | 2.84 | 3.09 | 1.81 | 1.37 | 0.59 | 0.47 | 19.56 |
| Austin | 1.75 | 2.50 | 1.75 | 3.25 | 4.25 | 3.25 | 2.00 | 2.25 | 4.00 | 3.25 | 2.25 | 2.25 | 32.75 |
| Brownsville | 1.25 | 1.50 | 0.50 | 1.75 | 2.50 | 2.75 | 1.75 | 2.75 | 5.25 | 3.50 | 1.25 | 1.25 | 26.00 |
| College Station | 2.91 | 3.06 | 2.81 | 3.97 | 4.60 | 3.40 | 2.44 | 2.27 | 3.40 | 3.46 | 3.18 | 3.41 | 38.90 |
| Corpus Christi | 1.55 | 1.58 | 0.91 | 2.07 | 2.88 | 3.15 | 2.00 | 3.37 | 6.07 | 3.13 | 1.43 | 1.43 | 29.57 |
| Dallas/Ft. Worth | 2.03 | 2.26 | 2.77 | 4.50 | 4.61 | 3.07 | 2.09 | 2.16 | 3.36 | 3.47 | 2.31 | 2.31 | 34.94 |
| Del Rio | 0.75 | 1.00 | 0.85 | 1.75 | 2.75 | 2.50 | 1.75 | 2.25 | 3.00 | 2.50 | 1.25 | 1.25 | 21.60 |
| El Paso | 0.40 | 0.42 | 0.30 | 0.17 | 0.24 | 0.59 | 1.69 | 1.13 | 1.40 | 0.76 | 0.30 | 0.30 | 7.70 |
| Galveston | 3.75 | 3.00 | 2.15 | 3.25 | 4.00 | 4.00 | 4.00 | 4.50 | 6.00 | 3.25 | 3.25 | 3.75 | 44.90 |
| Houston | 3.75 | 3.25 | 2.75 | 3.50 | 4.25 | 5.00 | 4.75 | 3.75 | 5.25 | 3.75 | 3.75 | 3.75 | 47.50 |
| Lubbock | 0.50 | 0.56 | 0.87 | 1.22 | 2.73 | 2.56 | 2.17 | 2.05 | 2.53 | 2.03 | 0.61 | 0.61 | 18.44 |
| Midland | 0.50 | 0.65 | 0.50 | 0.75 | 2.00 | 1.50 | 2.00 | 1.75 | 2.50 | 1.50 | 0.60 | 0.50 | 14.75 |
| Port Arthur | 4.25 | 3.50 | 2.75 | 4.25 | 4.00 | 5.25 | 5.00 | 6.00 | 3.50 | 4.00 | 4.00 | 4.00 | 50.50 |
| San Angelo | 0.73 | 0.79 | 0.74 | 1.86 | 2.56 | 1.83 | 1.25 | 1.70 | 2.74 | 2.07 | 0.87 | 0.54 | 17.68 |
| San Antonio | 1.75 | 2.10 | 1.75 | 3.00 | 3.75 | 2.75 | 1.75 | 2.75 | 4.00 | 3.00 | 2.25 | 1.50 | 30.35 |
| Victoria | 2.25 | 2.50 | 1.50 | 2.75 | 4.20 | 3.75 | 2.50 | 3.25 | 6.00 | 3.75 | 2.50 | 2.25 | 37.20 |
| Waco | 1.75 | 2.25 | 2.00 | 3.75 | 4.75 | 3.00 | 2.25 | 2.00 | 3.50 | 3.50 | 2.50 | 2.00 | 33.25 |
| Wichita Falls | 1.04 | 1.18 | 1.71 | 2.78 | 4.69 | 3.05 | 2.19 | 2.16 | 3.02 | 2.63 | 1.56 | 1.44 | 27.45 |

TABLE 2

Potential Evapotranspiration (PET) in Inches per Month

| City | Jan | Feb | Mar | Apr | May | Jun | Jul | Aug | Sep | Oct | Nov | Dec | Total |
|---|---|---|---|---|---|---|---|---|---|---|---|---|---|
| Abilene | 1.20 | 1.60 | 3.90 | 4.70 | 7.90 | 8.61 | 8.75 | 8.15 | 7.10 | 4.90 | 2.80 | 1.00 | 60.61 |
| Amarillo | 1.20 | 1.50 | 3.80 | 5.00 | 8.88 | 9.72 | 9.61 | 8.95 | 6.80 | 4.70 | 2.60 | 1.20 | 63.96 |
| Austin | 2.00 | 2.66 | 4.30 | 5.27 | 7.55 | 8.28 | 8.12 | 8.20 | 6.22 | 4.93 | 3.08 | 2.08 | 62.69 |
| Brownsville | 2.57 | 3.18 | 4.53 | 5.31 | 6.88 | 7.31 | 7.59 | 7.33 | 5.98 | 5.16 | 3.40 | 2.42 | 61.66 |
| College Station | 2.00 | 2.65 | 4.23 | 5.22 | 7.57 | 8.35 | 8.20 | 8.41 | 6.25 | 4.91 | 2.83 | 2.04 | 62.66 |
| Corpus Christi | 2.42 | 3.06 | 4.56 | 5.31 | 6.97 | 7.53 | 7.89 | 7.45 | 5.95 | 5.12 | 3.28 | 2.30 | 61.84 |
| Dallas/Ft. Worth | 1.80 | 2.45 | 4.09 | 5.15 | 7.41 | 8.42 | 8.76 | 8.13 | 6.13 | 4.49 | 2.62 | 1.72 | 61.17 |
| Del Rio | 1.30 | 1.80 | 4.30 | 5.20 | 8.01 | 8.71 | 8.26 | 8.24 | 7.70 | 6.00 | 3.00 | 1.10 | 63.62 |
| El Paso | 1.30 | 1.70 | 4.20 | 5.60 | 8.88 | 9.91 | 9.24 | 8.32 | 7.60 | 5.20 | 3.00 | 1.10 | 66.05 |
| Galveston | 1.65 | 2.10 | 3.14 | 4.04 | 4.84 | 5.18 | 4.97 | 5.10 | 5.05 | 3.99 | 2.51 | 1.71 | 44.28 |
| Houston | 2.02 | 2.71 | 4.03 | 5.23 | 7.48 | 8.08 | 7.79 | 7.78 | 6.06 | 4.90 | 3.06 | 2.12 | 61.26 |
| Lubbock | 1.20 | 2.10 | 4.60 | 5.40 | 8.37 | 9.23 | 9.06 | 8.26 | 6.60 | 5.00 | 2.30 | 1.00 | 63.12 |
| Midland | 1.30 | 1.70 | 4.20 | 5.60 | 8.60 | 9.23 | 9.10 | 8.35 | 7.60 | 5.20 | 3.00 | 1.10 | 64.98 |
| Port Arthur | 1.98 | 2.71 | 4.09 | 4.93 | 7.09 | 7.66 | 7:25 | 7.27 | 5.82 | 4.74 | 2.95 | 2.00 | 58.49 |
| San Angelo | 1.30 | 1.80 | 4.30 | 5.20 | 8.01 | 8.71 | 8.26 | 8.24 | 7.70 | 6.00 | 3.00 | 1.10 | 63.62 |
| San Antonio | 2.07 | 2.77 | 4.40 | 5.33 | 7.58 | 8.21 | 7.96 | 8.03 | 6.19 | 4.95 | 3.14 | 2.15 | 62.78 |
| Victoria | 2.13 | 2.78 | 4.34 | 5.18 | 7.13 | 7.65 | 7.94 | 7.59 | 6.09 | 5.02 | 3.19 | 2.23 | 61.27 |
| Waco | 1.92 | 2.57 | 4.27 | 5.26 | 7.55 | 8.38 | 8.74 | 8.27 | 6.30 | 4.94 | 2.74 | 1.79 | 62.73 |
| Wichita Falls | 1.10 | 1.50 | 3.70 | 4.50 | 7.89 | 8.86 | 9.20 | 8.50 | 6.70 | 5.20 | 2.10 | 0.90 | 60.15 |

Consideration of the PET and rainfall for the city of Irving, Texas during June 1999, shown in Table 3, is helpful to understand the benefits from this use of the method taught by the present invention.

TABLE 3

| Date | PET (inches/day) | Temp (deg F) Max | Temp (deg F) Min | Min_RH (%) | Solar Radiation (MJ/m^2) | Rain (inches) | Avg Wind (mph) 4 a.m. | Avg Wind (mph) 4 p.m. |
|---|---|---|---|---|---|---|---|---|
| 6/1 | 0.21 | 96 | 76 | 27 | 22.1 | 1.0 | 2.4 | 2.1 |
| 6/2 | 0.21 | 94 | 75 | 26 | 24.8 | 0.7 | 0.4 | 1.9 |
| 6/3 | 0.21 | 93 | 75 | 25 | 24.9 | 0.4 | 0.2 | 2.6 |
| 6/4 | 0.22 | 94 | 76 | 22 | 24.3 | 0.0 | 2.0 | 2.5 |
| 6/5 | 0.21 | 95 | 76 | 20 | 23.0 | 0.0 | 2.4 | 2.7 |
| 6/6 | 0.21 | 93 | 76 | 20 | 24.4 | 0.0 | 2.2 | 1.3 |
| 6/7 | 0.19 | 93 | 76 | 21 | 23.1 | 0.0 | 1.0 | 1.9 |
| 6/8 | 0.20 | 94 | 73 | 22 | 22.8 | 0.0 | 0.2 | 2.0 |
| 6/9 | 0.18 | 91 | 73 | 26 | 19.8 | 0.0 | 0.3 | 2.0 |
| 6/10 | 0.16 | 92 | 73 | 26 | 18.2 | 0.0 | 1.3 | 1.3 |
| 6/11 | 0.18 | 96 | 72 | 16 | 24.2 | 0.1 | 1.1 | 0.3 |
| 6/12 | 0.12 | 89 | 73 | 32 | 13.5 | 0.0 | 0.5 | 0.5 |
| 6/13 | 0.17 | 93 | 70 | 21 | 22.4 | 0.1 | 0.0 | 1.6 |
| 6/14 | 0.17 | 89 | 72 | 25 | 21.0 | 0.1 | 0.5 | 1.5 |
| 6/15 | 0.14 | 88 | 70 | 26 | 16.4 | 0.1 | 0.3 | 0.8 |
| 6/16 | 0.15 | 96 | 73 | 12 | 22.4 | 0.1 | 0.0 | 0.5 |
| 6/17 | 0.15 | 84 | 68 | 26 | 16.0 | 0.2 | 1.3 | 0.1 |
| 6/18 | 0.17 | 89 | 69 | 21 | 22.3 | 0.0 | 0.6 | 1.2 |
| 6/19 | 0.19 | 94 | 69 | 19 | 23.8 | 0.2 | 0.9 | 1.9 |
| 6/20 | 0.15 | 90 | 73 | 23 | 16.2 | 0.1 | 0.0 | 2.0 |
| 6/21 | 0.10 | 86 | 72 | 31 | 9.1 | 0.2 | 0.0 | 1.2 |
| 6/22 | 0.13 | 88 | 73 | 40 | 14.5 | 2.0 | 0.0 | 2.0 |
| 6/23 | 0.19 | 94 | 75 | 25 | 22.3 | 0.1 | 2.0 | 2.3 |
| 6/24 | 0.13 | 89 | 73 | 38 | 11.5 | 0.1 | 1.4 | 0.5 |
| 6/25 | 0.13 | 91 | 73 | 32 | 14.6 | 0.1 | 0.1 | 1.1 |
| 6/26 | 0.18 | 97 | 74 | 28 | 23.0 | 0.3 | 0.1 | 2.4 |
| 6/27 | 0.21 | 96 | 81 | 25 | 21.6 | 0.2 | 1.8 | 2.5 |

On eight days (1, 2, 3, 17, 19, 21, 22 and 26) the rainfall in Irving exceeded the PET. On those days, if the present invention had been used to control the irrigation systems in Irving, there would have been very little or no need for use of additional irrigation water. On ten other days (11, 13, 14, 15, 16, 20, 23, 24, 25 and 27) the rainfall was at least half of the PET. On these days, if the rain occurred before the method of the present invention turned on the irrigation system, or if the prediction of rainfall had been high enough to defer the watering event, then the present invention would have saved irrigation water when compared to the methods taught by the prior art. It is, of course, in the nature of this type of irrigation control that the benefits of water savings are statistical over a period of time. The method of the present invention maximizes the possibility that the rain will happen before the irrigation system must irrigate.

Adaptive Irrigation Control

Figure 4:
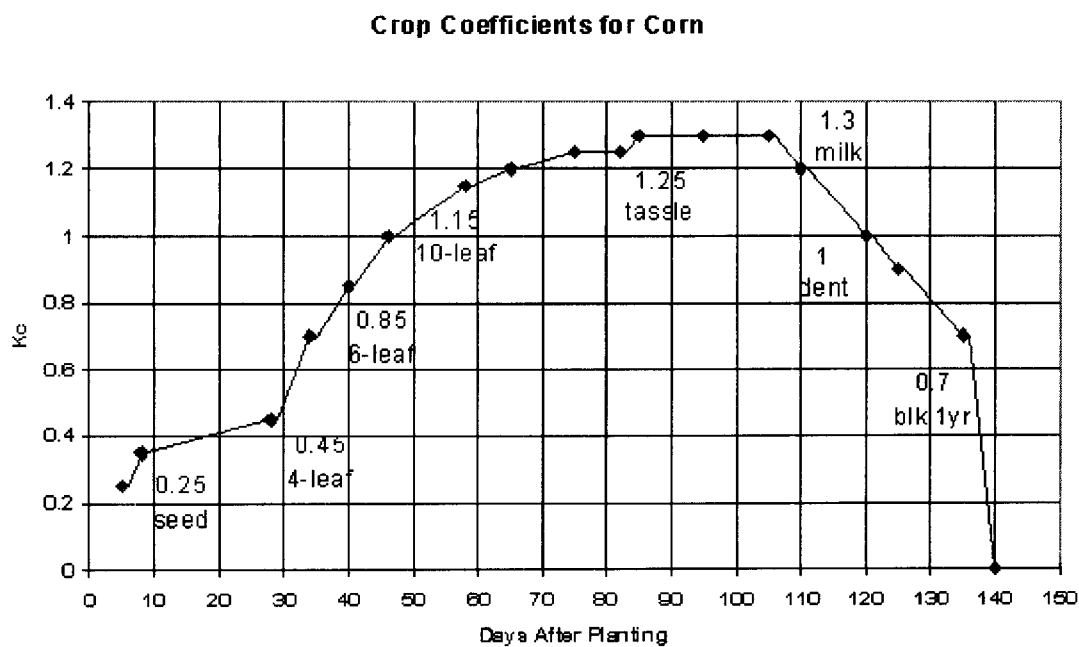
FIG. 4 is a graph showing the PET crop coefficient for corn during the normal growing season of the plant.
Figure 5:
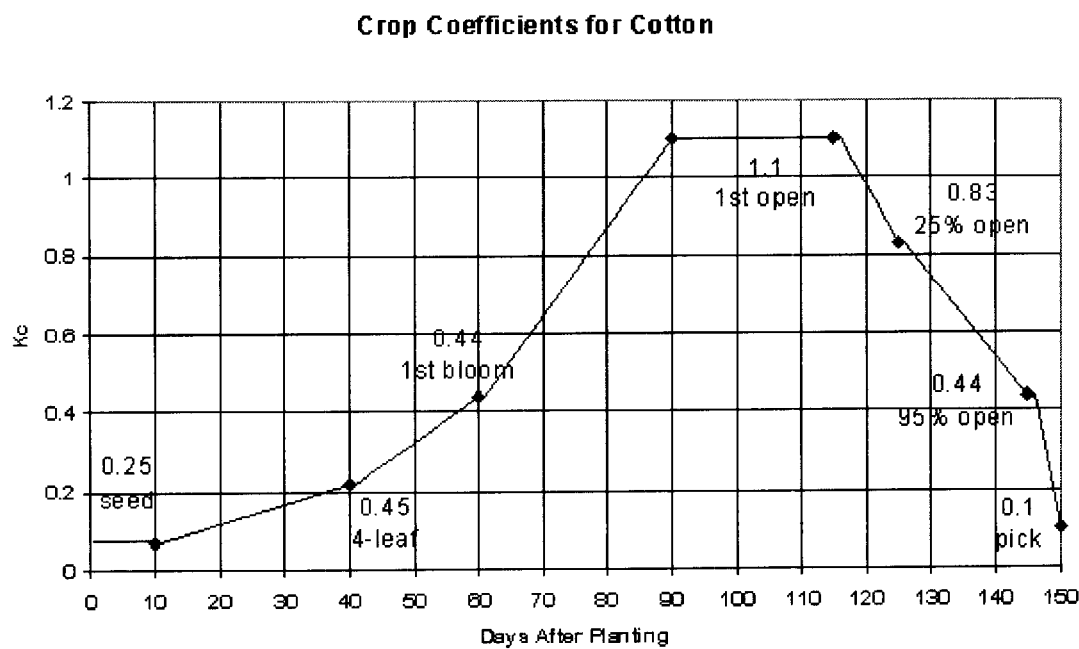
FIG. 5 is a graph showing the PET crop coefficient for cotton during the normal growing season of the plant.
Figure 6:
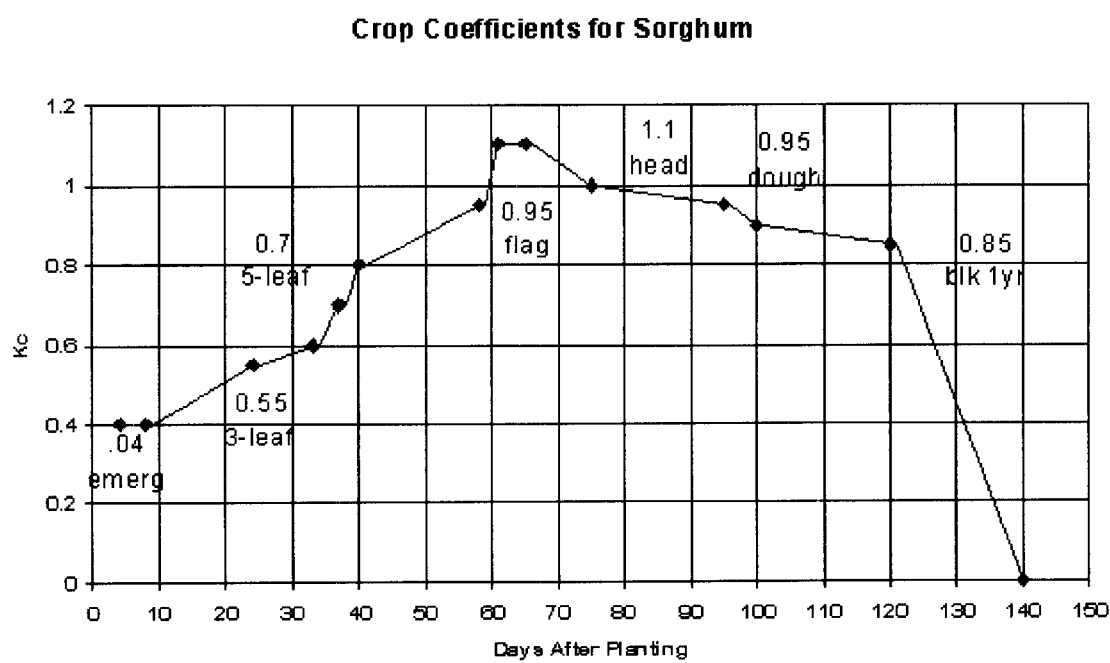
FIG. 6 is a graph showing the PET crop coefficient for sorghum during the normal growing season of the plant.

FIGS. 4, 5 and 6 show the PET crop coefficient for corn, cotton and sorghum, respectively. The crop coefficient is the constant that relates the PET, which is a reference value, to the actual crop requirement for water at a specific time and for a specific crop. It is readily apparent from these Figures that different crops require very different amounts of water and that for each crop the amount of water needed is a strong function of where the plant is in its life cycle. What is not as readily apparent from this data is that these curves are average results from laboratory plot measurements. They do not necessarily conform to the actual requirements of crops in a agricultural setting. Thus use of these typical or average crop coefficients to calculate the amount of water to apply to a crop could result in either over or under watering in a real world situation. The method of the present invention solves this problem as follows: first data from several qualified watering events, from the recent history of the irrigation system, is used to determine the response of the soil tension or moisture content to the application of water. Next the method of Least Squares Regression analysis, or other effective curve fitting means, is used to determine an actual in situ characteristic curve for the specific crop/soil combination being irrigated. Next this in situ characteristic curve is used to calculate the amount of water required to bring the soil moisture (or tension) from its measured present value to the desired value for each watering event. This method will be superior to those taught by the prior art because the method of the present invention is based on the actual soil in its present state inclusive of the active plant root system.

This method of the invention:

Requires a measurement of water applied.

Requires measurement of soil tension and/or moisture content.

Water events must be qualified to remove erroneous values.

Modified Watering Schedule Based on a High Rain Probability

As was mentioned briefly above, the method of the present invention may use various remote data communication methods (e.g. pager, radio modem, phone, IR, etc.) or by direct data entry to the controller front panel, to delay or reduce watering when a high probability of rain exists. When there is a high probability of rain, one or more messages are sent via various remote data communication methods to one or more irrigation controllers. These controllers then defer irrigation or reduce the planned amount of irrigation to give nature an opportunity to supply the necessary water via rain. If the probability of rain is sufficiently high then there is little risk to the plants if the irrigation event is skipped. For moderately high rain probabilities, it may be better to reduce the amount of irrigation water, but not skip the watering event entirely. This option reduces irrigation water use by giving nature additional time to provide the water. This option does not impose excessive risk of plant damage if rain does not occur because some water was applied.

Examples
   Delay a full day if the Probability >90%
   Reduce irrigation a specified fraction when the 60% <=Probability <=90%
   Limit the number of delayed irrigation events regardless of the Probability of rain to prevent damage to the plants.

Conserve Water by Scheduling Based on "End time"

All known prior art irrigation controllers begin to apply water to one or more stations based on a predefined start time. When the controller's clock matches or exceeds the start time, the controller activates appropriate hardware (typically one or more valves) to start the watering. The station water demand may be fixed or may vary from one day to the next based on sensor or other inputs to the controller. Some controllers also have a rain shut-off device that causes the controller to stop watering when it is raining and for some time period after the rain has stopped.

The present invention is a method that causes an irrigation controller to begin to apply water to one or more stations based on a calculated start time that depends on a predefined stop time. The predefined stop time can be user-defined, or can be referenced to daily sunrise or sunset time, or other time criteria or event.

The calculated start time is based on an estimate of time that it will take for the controller to irrigate to meet the water demands of one or more stations and end the watering at or near the stop time. This is particularly useful when the controller has sensor inputs that allow the controller to calculate a varying zone water demand from one day to the next. By starting the application of water as referenced to a stop time, and not referenced to a predefined start time, the controller can defer applying water as long as possible, while still meeting the water demands of one or more stations.

Since the invention causes the controller to defer applying water while still meeting the daily water demands, this has an advantage over existing controllers in that additional water can be saved (conserved). For example, a prior art controller has a predefined watering window of 7:00 pm to 7:00 am. Only during this time period will the controller apply water. At a predefined start time of 7:00 pm, the irrigation controller begins applying water to one or more zones. Based on today's water demand (of stations controlled by the controller), the controller will apply water for 10 hours ending at 5:00 am. In contrast, an irrigation controller that is directed by the method of the present invention has the same predefined watering window of 7:00 pm to 7:00 am. Only during this time period will the controller apply water. Based on the same zone water demand, the controller will need to apply water for 10 hours ending at a predefined stop time of 7:00 am. Thus its calculated start time is 9:00 pm. Should it begin to rain enough at 8:00 pm to activate the rain shut-off device for the remainder of the time defined by the watering window, the controller based on this invention will not apply water at all, whereas the existing controller will already have applied water for an hour. Thus, this invention provides the maximum possibility for rain to provide the water, which eliminates or reduces the need to irrigate the current and/or remaining stations.

Conserve Watering by Scheduling Based on Station Flow Rate

The method of the present invention may irrigate the station requiring the greatest flow rate of water last (i.e. irrigate stations in ascending order of flow rate). If it begins to rain while irrigating a station, the water dispensed prior to the rain cannot be recovered. If the station requiring the greatest flow rate is planned as the last station to be irrigated, then rain may offset or eliminate the need to irrigate this station of higher flow rate resulting in a greater savings of water over time. For example, suppose two stations are scheduled to be watered back-to-back. Station A has a flow rate of 20 gal/min and is scheduled to run 60 minutes for a total of 1200 gallons. Station B has a flow rate of 25 gal/min and is also scheduled to run 60 minutes for a total of 1500 gallons. Suppose it starts to rain 60 minutes after the first station has starting watering (i.e, the first station completes its watering). If the station with the lower flow rate (Station A) runs before Station B, then Station A will have dispensed 1200 gallons during the first hour and Station B will not run (because of the rain) resulting in a savings of 1500 gallons. On the other hand, if the controller with the higher flow rate (Station B) had run first, then Station B would have dispensed 1500 gallons during the first hour and Station A will not run resulting in a savings of only 1200 gallons.

This is easily verified using simple calculus. For a=station a, b=Station b, V=volume (gallons), R=rate (gal/min), $t_1$=initial time, and $t_2$=final time:

$$V_a = \int_{t_1}^{t_2} R_a \cdot dt = R_a \cdot (t_2 - t_1)$$

$$V_b = \int_{t_1}^{t_2} R_b \cdot dt = R_b \cdot (t_2 - t_1)$$

Over a given time ($t_1$ to $t_2$), for rate $R_a$ less than rate $R_b$, then the total volume of water dispensed $V_a$ will always be less than volume $V_b$. Water is thus conserved by waiting as long as possible to dispense at the higher flow rate, thus giving nature a better chance to instead provide the water by rain.

This method of scheduling can also be combined with "end time based scheduling" to achieve even greater water savings.

Conserve Water by Scheduling Based on a Station's Volume

The method of the present invention may irrigate the station requiring the greatest volume of water last (i.e., irrigate stations in ascending order of calculated water volume). If it begins to rain while irrigating a station, the water dispensed prior to the rain cannot be recovered. If the station requiring the greatest amount of water is planned as the last station to be irrigated in a given cycle, then rain may eliminate the need to irrigate this station.

Use Measured Rain to Adjust the Amount of Water to Apply

The measured rainfall can be used to stop, delay, and/or adjust the amount of remaining water to apply to meet the needs of the plants while minimizing the amount of irrigation water used. Example: If a watering event is scheduled to dispense 0.5 inch of water and it begins to rain after the first 0.1 inch of water is delivered then the controller will stop applying water when the rain is detected. Once the rain has stopped, the system will dispense the balance of the planned 0.5 inch of water. Since the irrigation system dispensed 0.1 inch of water prior to the rain and the rain event delivered 0.2 inch, the balance of water needed is 0.5−0.1−0.2=0.2 inch. Therefore, the net savings are 0.2 inch of water. If the balance at the end of the rain event were zero, then no additional water would be needed and the net savings are 0.4 inch of water.

Specifying Irrigation Amount in Inches of Water

Prior art irrigation controllers define the amount of water to be applied to a station based on the user entry (specification) of the run time of a station (typically in minutes). This run time is precalculated (or guessed) by the user based on some knowledge of the estimated or actual flow rate of the station (or based on a guess). In the invention, for a similar controller and similar flow rate knowledge (or a guess), the amount of water to be applied to a station is based on the user entry (specification) of the amount of inches (or similar unit such as centimeters) that the controller is to apply. The controller then calculates the required run time (typically in minutes) from the user specification. The primary advantage of the invention is that the user can specify the amount of water to apply in familiar precipitation units and does not have to calculate the runtime since the controller makes the calculation.

Calculation of Irrigation Amount in Inches of Water

Prior art irrigation controllers apply water by controlling the amount of time a station is on in a fixed number of minutes, seconds, or other time base. The amount of water applied is based upon an estimate, a guess, or a previous measurement. If the station's flow rate has changed for some reason, an incorrect amount of water will then be applied. If the area of a station is known and the water flow rate is measured, the correct amount of water can be applied in inches, centimeters, or other similar precipitation-type unit. The accuracy of the amount of water dispensed is no longer based on an estimate, a guess, or a previous measurement. The present invention does this by measuring the water flowing through the system with a flow meter, as is well known.

Start Up or "Set In" Mode

Irrigation controllers using moisture sensors, evapotranspiration (ET), and/or other methods to determine the amount of water to apply to a station can suffer from problems when used with newly planted landscapes. Newly planted landscapes do not meet the basic assumptions of moisture sensors and ET methods because the plant's roots are not in intimate contact with the soil particles. Time is needed for the plants root system to become fully integrated into the soil. During this time the plants need a reliable supply of water until their roots have recovered from transplanting and can fully access the water stored in the soil. The method of the present invention uses a start up or "set in" mode to apply a defined amount of water to the station for each watering event (daily, every other day, etc.) over a fixed period of time. After the fixed period has ended, variable irrigation methods such as ET or moisture sensor based control algorithms can take over control. For example, suppose new turf is installed. With a "set in" mode, the controller is then set to water the station with the new turf for 0.5 inches every other day for a time period of 21 days. After 21 days have expired, the controller then automatically changes its control method for the station to be based on an ET measurement, moisture sensor measurement, or other method.

The preferred embodiment of the present invention described above is illustrative of the best embodiment known to the inventors, but it should be considered as illustrative only and not limiting. The present invention should be limited only by the scope of the appended claims.

We claim:

1. A method of controlling a watering event of an irrigation system to minimize irrigation water use comprising:
   defining a late as possible end time for the current watering event,
   calculating the start time for the watering event based on the defined end time of the watering event, the water delivery capacity of the irrigation system and the water requirements of the plants and soil being irrigated,
   measuring the rainfall since the prior watering event before the calculated start time of the current watering event, and
   recalculating the start time for the current watering event including the contribution of water from the rainfall to the water requirements of the plants and soil being irrigated.

2. A method of controlling an irrigation system as in claim 1 including the step of delaying the current watering event if the probability of rainfall is high.

3. A method of controlling an irrigation system as in claim 1 including the step of reducing the amount of water delivered during the current watering event if the probability of rain is high.

4. A method of controlling an irrigation system as in claim 1 wherein the step of calculating the water requirements of the plants and soil being irrigated comprises the method of measuring the moisture content of the soil as a function of water applied during several recent watering events, curve fitting the measurements to produce a characteristic curve that plots the amount of water required to produce a desired soil moisture from a measured soil moisture.

5. A method of controlling an irrigation system as in claim 4 wherein the method includes measurement of water tension in the soil.

6. A method of controlling an irrigation system as in claim 1 wherein the irrigation system has a plurality of irrigation zones and including the step of irrigating the zones in ascending order of water flow rate.

7. A method of controlling an irrigation system as in claim 6 wherein the plurality of irrigation zones are irrigated in ascending order of water volume.

8. A method of controlling an irrigation system as in claim 1 wherein the calculation of the amount of water required for the watering event is made in inches of water, or other familiar precipitation units, and the actual amount of water provided by the irrigation system is measured by a flow meter.

9. A method of controlling an irrigation system as in claim 1 wherein the calculation of the start time of the watering event includes consideration of the PET of the soil and crop and the crop coefficient of the crop being irrigated.

10. A method of controlling an irrigation system as in claim 1 wherein the irrigation is of a crop newly planted and the calculation of the start time for the current watering event includes a defined amount of water as a set in irrigation for the newly planted crop.

* * * * *